US008300810B2

(12) United States Patent
Braun et al.

(10) Patent No.: US 8,300,810 B2
(45) Date of Patent: Oct. 30, 2012

(54) METHOD FOR SECURELY ENCRYPTING OR DECRYPTING A MESSAGE

(75) Inventors: Michael Braun, Munich (DE); Anton Kargl, Munich (DE); Bernd Meyer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1145 days.

(21) Appl. No.: 12/073,556

(22) Filed: Mar. 6, 2008

(65) Prior Publication Data

US 2008/0205639 A1   Aug. 28, 2008

Related U.S. Application Data

(63) Continuation of application No. PCT/EP2006/064655, filed on Jul. 26, 2006.

(30) Foreign Application Priority Data

Sep. 6, 2005  (DE) .......................... 10 2005 042 339

(51) Int. Cl.
*H04K 1/00* (2006.01)
(52) U.S. Cl. .............................. 380/30; 713/189; 726/22
(58) Field of Classification Search .................. 380/30
See application file for complete search history.

(56) References Cited

U.S. PATENT DOCUMENTS

| 6,195,737 | B1 * | 2/2001 | Hollister et al. ............... 711/220 |
| 7,016,929 | B2 | 3/2006 | Fischer et al. |
| 2004/0267859 | A1 | 12/2004 | Fischer et al. |

FOREIGN PATENT DOCUMENTS

| DE | 101 51 129 A1 | 5/2003 |
| WO | 00/25204 | 5/2000 |

OTHER PUBLICATIONS

Chevallier-Mames, "Self-Randomized Exponentiation Algorithms", 2004 Gemplus, Security Card Group, France, pp. 1-14.*
Mamiya et al. Efficient Countermesaures Against RPA, DPA and SPA >>, 2004, pp. 343-356 (hereinafter Mamiya).*
Alfred J. Menezes, et al., "Handbook of Applied Cryptography", CRC-Press, 1996 (Table of Contents only, 6 pages).
M. Joye, "Recovering lost efficiency of exponentian algorithms on smart cards", Electronic Letters, vol. 38, No. 19, Sep. 12, 2002, pp. 1095-1097.
Chevallier-Mames B, "Self-Randomized Exponentiation Algorithms", Lecture Notes in Computer Science, Springer-Verlag, New York, NY, US, vol. 2964, pp. 236-249.
Pierre-Alain Fouque, et al., "Defeating Contermeasures Based on Randomized BSD Representations", Cryptographic Hardware and Embedded Systems—CHES 2004, Jul. 8, 2004, pp. 312-327, Cambridge, MA, USA.
Itoh K., et al., "DPA Countermeasures by Improving the Window Method", Cryptographic Hardware and Embedded Systems, International Workshop, Aug. 13, 2005, pp. 303-317.
Chevallier-Mames B, et al., "Low-Cost Solutions for Preventing Simple Side-Channel Analysis: Side-Channel Atomicity", IEEE Transactions on Computers, IEEE Service Center, Los Alamitos, CA, US, vol. 53, No. 6, Jun. 2004, pp. 760-768.
Changkyun Kim, et al., "A Secure and Practical CRT-Based RSA to Resist Side Channel Attacks" LNCS International Conference, ASSISI, Apr. 26. 2004, pp. 150-158.
International Search Report (PCT/ISA/210), mailed Oct. 23, 2006 in connection with the International Application No. PCT/EP2006/064655.
James Alexander Muir, "Techniques of Side Channel Cryptanalysis", A Thesis presented to the University of Waterloo in Fulfillment of the Thesis Requirement for the Degree of Master of Mathematics in Combinatorics and Optimization, 2001.

* cited by examiner

*Primary Examiner* — Shewaye Gelagay
(74) *Attorney, Agent, or Firm* — Staas & Halsey LLP

(57) ABSTRACT

A method for securely encrypting or decrypting a message or for generating or verifying a digital signature in a message, in which the message is subjected, with the aid of a processor, to a mathematical operation using a key (k) which can be represented in the form of a binary number with a sequence of bits, and computational operations are sequentially carried out on auxiliary variables for each bit. The dependence of the computational result on the values of individual bits is taken into account by reading the memory addresses from the auxiliary variables and assigning them to address variables. The difference between the addresses is calculated and, depending on the respective current bit, is added to, or subtracted from, the computer addresses. The assignment of the auxiliary variables to the address variables can thus be interchanged. As a result, the order and selection of the computational operations is controlled on the basis of bits without the program sequence having to contain jump instructions.

8 Claims, No Drawings

METHOD FOR SECURELY ENCRYPTING OR DECRYPTING A MESSAGE

CROSS REFERENCE TO RELATED APPLICATIONS

This is a continuing application, filed under 35 U.S.C. §111(a), of International Application No. Application No. PCT/EP2006/064655, filed on Jul. 26, 2006, it being further noted that foreign priority benefit is based upon German Application No. 10 2005 042 339.6, filed on Sep. 6, 2005, the contents of which are hereby incorporated by reference.

BACKGROUND

The invention relates to a method for securely encrypting or decrypting a message or for generating or verifying a digital signature of a message, wherein a mathematical operation is applied to the message with the aid of a processor using a key, which can be represented as a binary number with a sequence of bits.

Asymmetrical cryptography systems ensure a high level of security by setting up key pairs made up of a private and public key, so that it is almost impossible for an attacker to decrypt the private key or the message encrypted with the public key in finite time. Standard cryptography systems, like those based on elliptic curves, are based on an encryption that can be carried out in polynomial time, but can only be inverted in bits in exponential time relative to the length of the key. In the case of systems based on elliptic curves, key lengths of $n=160$ to $192$ bits are currently used, in the case of systems based on RSA algorithms, lengths of $n=1024$ to $1536$ bits have to be used for a roughly identical level of security.

An alternative to the attack methods based on encryption inversion, which themselves also comprise algorithms to crack the algorithm underlying the encryption as efficiently as possible, is what are known as side-channel attacks. These can be used in particular with mobile aids, such as smart cards or dongles, on which secret key material is stored to allow an encrypted exchange of messages or to generate digital signatures or to re-encrypt.

The attacker uses the comparatively easy accessibility of data lines of the corresponding circuits to measure physical variables, such as power, electromagnetic radiation, results in the event of induced errors or propagation times of specific calculations. By directly evaluating measured values based on a simple power analysis (SPA) or by recording measured values such as power using a storage oscilloscope and then evaluating them statistically it is possible to obtain information about the underlying algorithm or even simply just about a currently existing key in an efficient manner.

The latter will be explained in more detail using an example: an encryption method provides for the application of a mathematical operation both for algorithms based on elliptic curves and for those based on the RSA method. In the case of the RSA method a modular exponentiation $$z = a^k \bmod N$$

has to be carried out, where the module N and a are natural numbers and k is a key (private or public) or at least a variable derived therefrom. In the case of elliptic curves a scalar multiplication $$Q = k*P$$

has to be carried out as the mathematical operation, where P is a point on an elliptic curve over a finite field K and k again is a key or a variable derived therefrom.

An elliptic curve is a zero set of a quadratic equation $$y^2 + a_1 xy + a_3 y = x^3 + a_2 x^2 + a_4 x + a_6,$$

with coefficients $a_i$ in a finite field. The elliptic curve has no singular points and, when an infinitely distant point is added as a neutral element, forms an additive group, whose group law can be interpreted geometrically. Each straight line intersects an elliptic curve at three not necessarily different points and a third point can be calculated for every two points, so that the sum of the three points is the neutral element. The addition is carried out (geometrically speaking) by plotting a straight line through two points P and Q, determining the third point S intersecting the elliptic curve and mirroring the point at the x-axis. Scalar multiplication of a point with a scalar k is enabled by k-times addition of a point to itself.

Cryptosystems based on elliptic curves have been known since 1985 (introduced by Koblitz, N. and Miller, V.). This and the older RSA method (Rivest, R., Shamir, A., Adleman, L.) are described in detail for example in Menezes, van Oorschot, Vanstone "Handbook of Applied Cryptography", CRC Press (1996). In contrast to elliptic curves, in RSA systems calculations are carried out in multiplicative semigroups. The analogy of the addition according to the elliptic curve is the multiplication in the RSA system. An exponentiation results from the scalar multiplication here.

Returning to the explanatory example, it can be established that a computational conversion of the mathematical operation can take place by the following algorithm, where k is predefined by a binary representation ($b_i$, $i=n-1 \ldots 0$):

Algorithm 1a: (RSA: $z = a^k \bmod N$)

(1) $z \leftarrow 1$ (2) $i \leftarrow n - 1$ (3) while $i > -1$ (3.1) $z \leftarrow z^2 \bmod N$ (3.2) if $b_i = 1$, then $z \leftarrow z*a \bmod N$ (3.3) $i \leftarrow i - 1$ (4) return $z$ Algorithm 1b: (EC – elliptic curve: $Q = k*P$)

(1) $Q \leftarrow 0$ (2) $i \leftarrow n - 1$ (3) while $i > -1$ (3.1) $Q \leftarrow 2*Q$ (3.2) if $b_i = 1$ then $Q \leftarrow Q + P$ (3.3) $i \leftarrow i - 1$ (4) return $Q$ Therefore essentially two computation operations respectively are carried out in each loop, a so-called square-and-multiply with the RSA system and a so-called double-and-add with the EC system (EC will be used hereafter as an abbreviation of elliptic curves).

In the case of a simple power analysis (SPA) the power consumption profile of an exponentiation or scalar multiplication is analyzed. The scalar multiplication for example primarily includes additions and doubling operations. The operations differ substantially in the number of elementary operations in K, so that the power consumption is also different. It is therefore possible to draw conclusions about the individual bits and therefore the binary representation of k by a corresponding side-channel attack.

A first step in defending against such attacks is matching the power flows and computation propagation times that are a function of a respective bit for the two possible bits states 0 and 1, as shown below:

Algorithm 2a: ($RSA$: $z = a^k \mod N$)

(1) $z_0 \leftarrow 1$ (2) $i \leftarrow n - 1$ (3) while $i > -1$ (3.1) $z_0 \leftarrow z_0^2 \mod N$ (3.2) $z_1 \leftarrow z_0 * a \mod N$ (3.3) $z_0 \leftarrow z_{b_i}$ with $b_i = 0$ or $1$ (3.4) $i \leftarrow i - 1$ (4) return $z_0$ Algorithm 2b: ($EC$ – elliptic curve: $Q = k * P$)

(1) $Q_0 \leftarrow 0$ (2) $i \leftarrow n - 1$ (3) while $i > -1$ (3.1) $Q_0 \leftarrow 2 * Q_0$ (3.2) $Q_1 \leftarrow Q_0 + P$ (3.3) $Q_0 \leftarrow Q_{b_i}$ with $b_i = 0$ or $1$ (3.4) $i \leftarrow i - 1$ (4) return $Q_0$ The first computation operation (step 3.1) and also the second computation operation (step 3.2) are now executed in each instance independently of the value of the respective bit $b_i$. Nevertheless the propagation time increases not insignificantly here because more operations have to be carried out.

The value of the bit itself is only included in the allocation in step (3.3). If $b_i=0$, the point $Q_0$ (case EC) is only updated by itself in this loop. In other words: the value calculated in step (3.2) for $Q_1$ is not taken into account, it was calculated "in vain" in the sense of the utilization of its result. If however $b_i=1$, $Q_0$ is allocated the value $Q_1$. Based on the now two auxiliary variables $Q_0$, $Q_1$ a match is now achieved at least in power consumption and computation time in any instance as a result.

However this is not complete, as has been shown. Step (3.3) implies, as does an if/else query, a jump to addresses. Depending on the address a different power consumption can be perceived here too, so that a side-channel attack becomes possible.

An alternative method for defending against side-channel attacks is the so-called Montgomery ladder. This algorithm is particularly efficient in the case of elliptic curves but an application for RSA systems is also known from DE 10151129. When calculating the scalar multiplication it is not necessary to include the y-coordinate, if the product of the point on the elliptic curve and a factor k and at the same time a factor k+1 is calculated respectively. The y-coordinate can be reconstructed from two partial results in the case of elliptic curves.

The calculation of both results of the multiplications at the same time is advantageously integrated in a common system according to the algorithm, with the auxiliary variables defined for said purpose (R and S here) being updated efficiently with mutual assistance in each loop:

Algorithm 3: ($EC$ – elliptic curve: $Q = k * P$)

Montgomery ladder:

(1) $R \leftarrow P, S \leftarrow 0$ (2) $i \leftarrow n - 1$ (3) while $i > -1$ (3.1) if $b_i = 1 \{S \leftarrow S + R, R \leftarrow 2 * R\}$ (3.2) else $\{R \leftarrow R + S, S \leftarrow 2 * S\}$ (3.3) $i \leftarrow i - 1$ (4) return $R, S$ (5) reconstruct $k * P$ from the points $R, S$ and $P$ In the example shown in each loop the auxiliary variable R or the point R is 1*P ahead of the auxiliary variable or point S. P was predefined. For k=(1010)=10 for example S=10*P and R=11*P. The addition and doubling operation proceed in a completely uniform manner and independently of the bit. No conclusions about the bit sequence can be drawn from the sequence of operations. However the go-to instruction ("if" or "else") is a vulnerable point for an attack, as mentioned above.

SUMMARY

One possible object is therefore to provide a method for encrypting or decrypting or, as applicable, generating or verifying a digital signature of messages, which has better security against side-channel attacks.

The methods proposed by the inventors are directed towards the features shown for example in algorithms 2 and 3, whereby one concept linking the aspects is that of avoiding go-to instructions that can be measured in the power profile.

The inventors propose that the memory addresses of the auxiliary variables, with which the computation operations are executed during exponentiation or scalar multiplication, should be determined and operations should be executed with these. Provision is hereby made for calculating the difference between the memory addresses—expressed in each instance as numbers or mapped into the numeric range. If the calculated difference is added to a memory address as a function of the current key bit, if it has the smaller value, or subtracted, if it has the larger value, the memory address precisely of the respective other auxiliary variable (R or S or, as applicable, $z_0$ or $z_1$) is obtained. It is therefore possible, by such a calculation, to interchange the values of both auxiliary variables or to map one of the two auxiliary variables onto the respective other.

The interchanging of the values of the auxiliary variables is advantageous with the Montgomery ladder: specifically identical computation operations take place for both bit-dependent branch paths, but with a symmetrically interchanged arrangement of the auxiliary variables.

The calculation can be carried out for example as part of a multiplication of the bit value by the previously calculated difference between the memory address values. If the bit value is 0, no change will then occur during the addition or subtraction of the memory addresses. If the bit value is 1 however, the difference is subtracted or added in an identical manner.

In one aspect the bit value is brought to the end of a computer word, in other words it is made the least significant bit (LSB). A subsequent multiplication of the computer word by the difference gives a product which can be added first to a memory address. If the bit (LSB) to the value 0 is now cleared, multiplied again and the product again subtracted, this gives the original address, if the bit LSB was initially 0, the clearing process having changed nothing therefore. If it had the value 1 however, the difference in the address range precisely gives the memory address of the other auxiliary variable used during the mathematical operation.

The significant steps of the proposed method are the forming of the difference between the addresses and the addition or subtraction, as a function of the current bit value, of the difference from one of the memory addresses as a function of the bit to obtain the respective other. The go-to instruction is therefore not necessary, which can be seen as advantageous especially with the Montgomery ladder. The computation operations to be executed as a function of the bit value hitherto occupied different positions in the program sequence. In contrast the symmetrical nature of the auxiliary variables in the program instructions now means that identical computation operations can be accessed, with only the contents being interchanged symmetrically. As the go-to instruction is absent, detection of the different power uptake as a function of the bit value or a correspondingly different computation time can barely be detected, thereby increasing security against a side-channel attack.

DETAILED DESCRIPTION

An SPA secure algorithm is developed on the basis of the sequence of a Montgomery ladder according to the related art, as shown in Algorithm 3. The steps $$\text{if } b_i=1: \{S \leftarrow S+R, R \leftarrow 2*R\} \quad (3.1)$$

$$\text{else } \{R \leftarrow R+S, S \leftarrow 2*S\} \quad (3.2)$$

can be expressed simply as $$F1 = \{S \leftarrow S+R, R2*R\} \text{ and}$$

$$F2 = \{R \leftarrow R+S, S \leftarrow 2*S\}:$$

if $b_i=1:F1$, else $F2$.

With the inventor's knowledge that go-to instructions represent a vulnerable point in respect of side-channel attacks, a next step is interchanging the auxiliary variables at the beginning and end of a loop, if the key bit has the value 0. It is then only necessary to refer to one of the two branch addresses, perhaps F1:

$$\text{if } b_i=1:F1 \quad (3.1)$$

(3.2) else {interchange (R,S), F1, interchange (R,S)}. At this point detectability by side-channel attacks is again significantly increased, as two memory access operations per computer word are required during copying as a function of the bit value. With longer field elements numerous access operations are necessary, which is reflected significantly in the power uptake, when the key bit is currently not set, in other words is 0.

A match can be made, as shown in the following algorithm:

Algorithm 4: ($EC$ – elliptic curve: $Q = k * P$)

Montgomery ladder:

(1) $R \leftarrow P, S \leftarrow 0$ (2) $i \leftarrow n - 1$ (3) while $i > -1$ (3.1) if $b_1 = 1 \{r \leftarrow \text{address}(R), s \leftarrow \text{address}(S)\}$ (3.2) else $\{r \leftarrow \text{address}(S), s \leftarrow \text{address}(R)\}$ (3.3) load content $s$ to $S'$, load content $r$ to $R'$ (3.4) $S' \leftarrow S' + R'$ (3.5) $R' \leftarrow 2' * R'$ (3.6) store $S'$ to $s$, store $R'$ to $r$ (3.7) $i \leftarrow i - 1$ (4) return $R, S$ (5) reconstruct $k * P$ from the points $R, S$ and $P$.

r and s here are address variables and bring about the reversal of the auxiliary variables as a function of the bit value. r points to the address of the auxiliary variable or point R, when $b_i=1$ and the point S, when $b_i=0$.

The go-to instruction in (3.1) is avoided in that the difference between the address variables r and s is formed and this is multiplied by a computer word h, by storing the bit dependency. It should be assumed in the present instance that the address (S) is bigger than the address (R). The scalar k is also present in a field of computer words.

Algorithm 5: ($EC$ – elliptic curve: $Q = k * P$)

Montgomery ladder:

(1) $R \leftarrow P, S \leftarrow 0$ (2) $d \leftarrow \text{address}(S) - \text{address}(R)$ (3) $i \leftarrow n - 1$ (4) while $i > -1$ (4.1) Rotate $b_i$ cyclically to the $LSB$ of the computer word (4.2) Copy $h$ to $h'$, clear the $LSB$ from $h'$ (4.3) $r \leftarrow \text{address}(S), s \leftarrow \text{address}(R)$ (4.4) $m \leftarrow h * d$ (4.5) $r \leftarrow r - m, s \leftarrow s + m$ (4.6) $m \leftarrow h' * d$ (4.7) $r \leftarrow r + m, s \leftarrow s - m$ (4.8) load content $s$ to $S'$, load content $r$ to $R'$ (4.9) $S' \leftarrow S' + R'$ (4.10) $R' \leftarrow 2' * R'$ (4.11) store $S'$ to $s$, store $R'$ to $r$ (4.12) $i \leftarrow i - 1$ (5) return $R, S$ (6) reconstruct $k * P$ from the points $R, S$ and $P$.

The computer words h and h' differ numerically as a maximum by the value 1, because they can only differ in the LSB. If $b_i=1$, in steps (4.4) to (4.7) r is dropped from address(S) to address(R). This corresponds to the result after step (3.1) of algorithm 4, but no go-to instruction was necessary here. There was only a true multiplication of scalars (steps (4.4) and (4.6)).

The following sequence shows an application of the proposed method to an RSA method as in algorithm 2a according to the related art:

Algorithm 6: ($RSA$: $z = a^k \mod N$)

(1) $z_0 \leftarrow 1$ (2) $d \leftarrow \text{address}(z_0) - \text{address}(z_1)$ (3) $i \leftarrow n - 1$ (4) while $i > -1$ (4.1) $z_0 \leftarrow z_0^2 \mod N$ (4.2) $z_1 \leftarrow z_0 * a \mod N$ (4.3) Rotate $b_i$ cyclically to the $LSB$ of the computer word (4.4) Copy h to h', clear the $LSB$ from h'

(4.5) $r \leftarrow \text{address}(z_0)$ (4.6) $m \leftarrow h * d$ (4.5) $r \leftarrow r - m$ (4.6) $m \leftarrow h' * d$ (4.7) $r \leftarrow r + m$ (4.8) store content r to $z_0$ (4.9) $i \leftarrow i - 1$ (5) return $z_0$ In contrast to the Montgomery ladder, only one address must be calculated for elliptic curves in this algorithm. Only an intermediate value has to be stored.

The embodiments can be implemented in computing hardware (computing apparatus) and/or software, such as (in a non-limiting example) any computer that can store, retrieve, process and/or output data and/or communicate with other computers. The processes can also be distributed via, for example, downloading over a network such as the Internet. The results produced can be output to a display device, printer, readily accessible memory or another computer on a network. A program/software implementing the embodiments may be recorded on computer-readable media comprising computer-readable recording media. The program/software implementing the embodiments may also be transmitted over a transmission communication media such as a carrier wave. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

What is claimed is:

1. A computer-implemented method for securely encrypting or decrypting a message or verifying a digital signature of a message by applying a mathematical operation to the message using a key, the method comprising:
   inputting the key represented as a binary number with a sequence of bits;
   initializing a first auxiliary variable and a second auxiliary variable;
   determining first and second memory addresses respectively for the first and second auxiliary variables and assigning the first memory address to an address variable;
   calculating a differential value from a difference between the memory addresses;
   sequentially performing, by a computer, the following steps for each bit of the binary number starting from a most significant bit:
   (a) updating the first auxiliary variable by applying a first computation operation to the first auxiliary variable;
   (b) updating the second auxiliary variable by applying a second computation operation to the first auxiliary variable;
   (c) adding the differential value to the address variable as a function of the value of the current bit, so that either the memory address value of the first auxiliary variable or the memory address value of the second auxiliary variable is assigned to the address variable; and
   (d) updating the first auxiliary variable by using the auxiliary variable, whose memory address is assigned to the address variable; and
   after completing steps (a) through (d) for each bit, outputting the first auxiliary variable as a result of the mathematical operation and securely encrypting or decrypting the message or verifying a digital signature of the message by applying the mathematical operation to the message using the key, wherein
   the first auxiliary variable represents a point on an elliptic curve over a finite field,
   the first auxiliary variable is initialized to a first computation operation includes a scalar multiplication of the point by a factor 2,
   the second computation operation comprises adding the point and a permanently predefined point on the elliptic curve, and
   the mathematical operation comprises a scalar multiplication of the key and the permanently predefined point on the elliptic curve.

2. The method as claimed in claim 1, wherein
   during initialization a value 1 is assigned to the first auxiliary variable, and
   the first computation operation includes a squaring of the first auxiliary variable to multiply the first auxiliary variable by itself.

3. The method as claimed in claim 2, wherein
   a fixed base is predefined and the second computation operation includes a multiplication of the first auxiliary variable by the fixed base.

4. The method as claimed in claim 3, wherein
   a predefined number is used for a modular operation.

5. The method as claimed in claim 1, wherein adding the differential value to the address variable comprises:
forming a first computer word, wherein the current bit is used as a least significant bit in sequential processing;
multiplying the first computer word by the differential value to form a first product;
subtracting the first product from the address variable;
forming a second computer word from the first computer word, by setting the least significant bit to zero;
multiplying the second computer word by the differential value to form a second product; and
adding the second product to the address variable.

6. A computer-implemented method for securely encrypting or decrypting a message or verifying a digital signature of a message by applying a mathematical operation to the message using a key, the method comprising:
inputting the key represented as a binary number with a sequence of bits;
initializing a first auxiliary variable and a second auxiliary variable;
determining first and second memory addresses respectively for the first and second auxiliary variables;
assigning the first memory address to a first address variable and assigning the second memory address to a second address variable;
calculating a differential value from a difference between the first and second memory addresses;
sequentially performing, by a computer, the following steps for each bit of the binary number:
(a) adding the differential value to the first address variable and subtracting the differential value from the second address variable as a function of the value of the bit, so that:
either the memory address value of the first auxiliary variable is assigned to the first address variable and the memory address value of the second auxiliary variable is assigned to the second address variable,
or the memory address value of the second auxiliary variable is assigned to the first address variable and the memory address value of the first auxiliary variable is assigned to the second address variable;
(b) updating the auxiliary variable, which is assigned to the first address variable, by applying a first computation operation; and
(c) updating the auxiliary variable, which is assigned to the second address variable, by applying a second computation operation; and
after completing steps (a) through (c) for each bit, outputting the first and second auxiliary variables as a result of the mathematical operation and securely encrypting or decrypting the message or verifying a digital signature of the message by applying the mathematical operation to the message using the key, wherein
the first auxiliary variable represents a point on an elliptic curve over a finite field,
the first auxiliary value is initialized to a fixed point on the elliptic curve,
the second auxiliary variable represents a point on an elliptic curve over a finite field,
the second auxiliary value is allocated a value 0 during the initialization step,
the first computation operation comprises adding of two points on an elliptic curve and the second computation operation comprises a scalar multiplication of a point on an elliptic curve by a factor 2, and
the mathematical operation comprises a scalar multiplication of the key and a permanently predefined point on the elliptic curve.

7. The method as claimed in claim 6, wherein adding the differential value to the first address variable comprises:
forming a first computer word, wherein the current bit is used as a least significant bit in sequential processing the bits of the binary number;
multiplying the first computer word by the differential value to form a first product;
subtracting the first product from the first address variable;
forming a second computer word from the first computer word, by setting the least significant bit to zero;
multiplying the second computer word by the differential value to form a second product; and
adding the second product to the first address variable.

8. The method as claimed in claim 7, wherein subtracting the differential value from the second address variable comprises:
adding the first product to the second address variable; and
subtracting the second product from the second address variable.

* * * * *